(12) United States Patent
Stafford et al.

(10) Patent No.: US 8,234,501 B2
(45) Date of Patent: Jul. 31, 2012

(54) SYSTEM AND METHOD OF CONTROLLING ACCESS TO A DEVICE

(75) Inventors: Mark Stafford, San Carlos, CA (US); Jurijus Cizas, Castro Valley, CA (US)

(73) Assignee: Infineon Technologies AG, Neubiberg (DE)

( * ) Notice: Subject to any disclaimer, the term of this patent is extended or adjusted under 35 U.S.C. 154(b) by 1278 days.

(21) Appl. No.: 11/948,952

(22) Filed: Nov. 30, 2007

(65) Prior Publication Data

US 2009/0144553 A1  Jun. 4, 2009

(51) Int. Cl.
*G06F 21/00* (2006.01)
(52) U.S. Cl. ............................................ 713/184; 726/9
(58) Field of Classification Search .................. None
See application file for complete search history.

(56) References Cited

U.S. PATENT DOCUMENTS

| | | | |
|---|---|---|---|
| 6,259,908 B1 * | 7/2001 | Austin | 455/411 |
| 6,386,451 B1 | 5/2002 | Sehr | |
| 6,565,000 B2 | 5/2003 | Sehr | |
| 6,609,197 B1 * | 8/2003 | Ketcham et al. | 713/155 |
| 7,014,120 B2 | 3/2006 | Al Amri | |
| 2003/0023858 A1 | 1/2003 | Banerjee et al. | |
| 2003/0059051 A1 * | 3/2003 | Hatano et al. | 380/270 |
| 2003/0221011 A1 * | 11/2003 | Shitano | 709/229 |
| 2004/0006713 A1 * | 1/2004 | Minemura | 713/201 |
| 2005/0149758 A1 * | 7/2005 | Park | 713/201 |
| 2005/0240778 A1 | 10/2005 | Saito | |
| 2006/0259965 A1 * | 11/2006 | Chen | 726/20 |

* cited by examiner

*Primary Examiner* — David Pearson
(74) *Attorney, Agent, or Firm* — Dicke, Billig & Czaja, PLLC

(57) ABSTRACT

A method of controlling access to a device. First information is provided. Second information is retrieved from the device. The first information is used to retrieve associated third information. A key is generated based on the second information and the third information. Access to the device is controlled by using the key.

26 Claims, 3 Drawing Sheets

SYSTEM AND METHOD OF CONTROLLING ACCESS TO A DEVICE

CROSS-REFERENCE TO RELATED APPLICATIONS

This Utility Patent Application is related to U.S. patent application Ser. No. 11/948,962, entitled "SYSTEM AND METHOD OF ACCESSING A DEVICE," filed Nov. 30, 2007, which is incorporated herein by reference.

BACKGROUND

Cryptography can provide security services in a number of processor-based devices, such as computers, smart cards, personal data assistants (PDAs), and the like. Security services include user identification and authentication, access control, financial transactions, and other applications where high security is preferred or required. Cryptography provides data privacy by encrypting data, and provides data integrity by recognizing if data has been manipulated in an unauthorized way. By attaching a unique identifier to original data, cryptography also ensures data uniqueness by verifying that data is the original instead of a copy of the original.

One type of cryptography known as symmetric-key cryptography involves using the same or a substantially similar key or keys, also known as a secret key, for both encryption and decryption. The secret key represents a shared secret between two or more parties for securely transmitting and receiving private information over potentially insecure channels. For example, after the transmitting and receiving parties secretly agree on a secret key, the transmitting party encrypts data using the secret key and transmits the encrypted data over a network. The receiving party receives the encrypted data over the network and decrypts the encrypted data using the secret key. Although an eavesdropper with access to the network can access the encrypted data, the eavesdropper presumably does not have access to the secret key and therefore cannot easily decrypt the encrypted data.

When implementing symmetric-key cryptography between two or more parties, the parties typically agree on one or more secret keys in a secure environment before transmitting the encrypted data. Secret keys can be changed periodically to increase security of the encrypted data. The highest security can generally be achieved by generating a unique secret key for each transmission of encrypted data.

Secret keys are typically generated by a processor-based device that executes a suitable key generation algorithm. Once the secret keys are generated, they are stored in a memory that can be accessed by the parties that use the secret keys to encrypt and decrypt the data. If the memory is not sufficiently secure, it is possible that the encrypted data could be compromised.

For these and other reasons, there is a need for the present invention.

SUMMARY

One embodiment provides a method of controlling access to a device. First information is provided. Second information is retrieved from the device. The first information is used to retrieve associated third information. A key is generated based on the second information and the third information. Access to the device is controlled by using the key.

BRIEF DESCRIPTION OF THE DRAWINGS

The accompanying drawings are included to provide a further understanding of embodiments of the invention and are incorporated in and constitute a part of this specification. The elements of the drawings are not necessarily to scale relative to each other. Like reference numerals designate corresponding similar parts.

DETAILED DESCRIPTION

In the following Detailed Description, reference is made to the accompanying drawings which illustrate embodiments in which the invention may be practiced. It is to be understood that other embodiments may be utilized and structural or logical changes may be made without departing from the scope of the invention. The following detailed description is not to be taken in a limiting sense, and the scope of the invention is defined by the appended claims.

Figure 1:
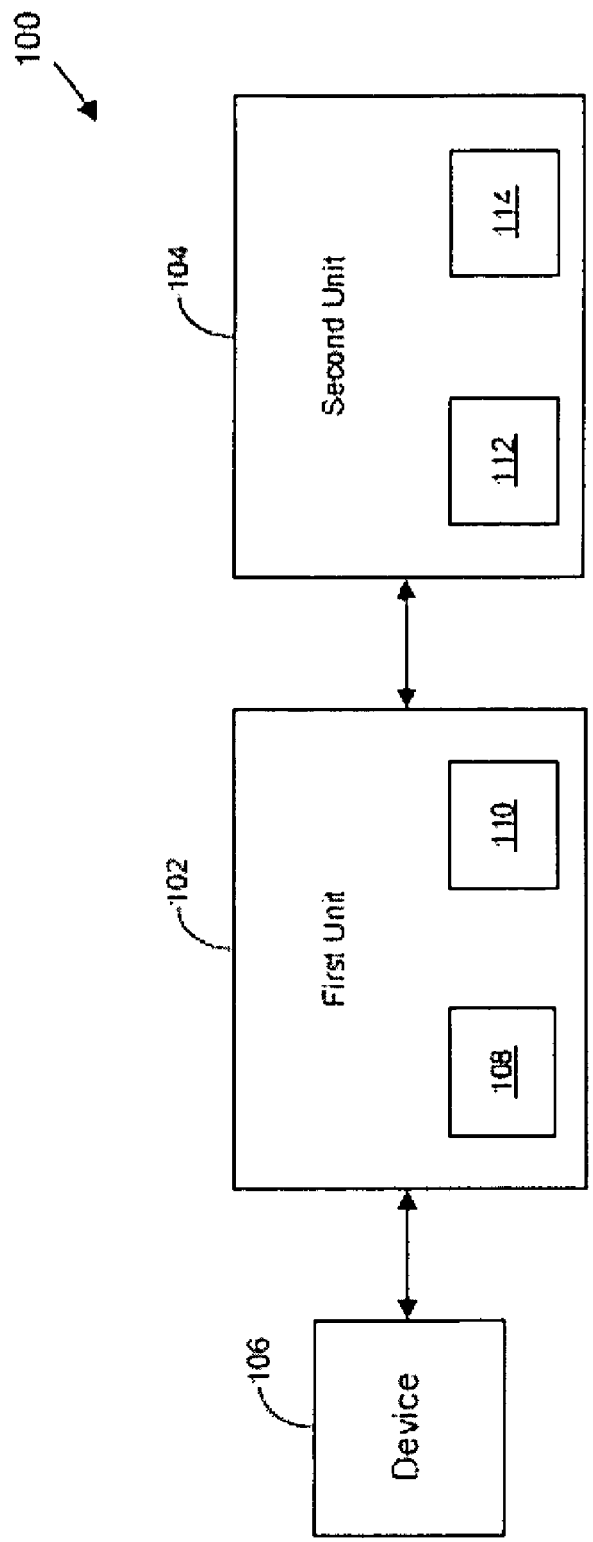
FIG. 1 is a block diagram illustrating one embodiment of a system.

FIG. 1 is a block diagram illustrating one embodiment of a system 100. System 100 includes a first unit 102, a second unit 104, and a device 106. First unit 102 includes a processor 108 and a memory 110. Second unit 104 includes a processor 112 and a memory 114. In the illustrated embodiment, second unit 104 is securely remote from first unit 102. In one embodiment, first unit 102 communicates bi-directionally with second unit 104 and device 106. In some embodiments, first unit 102 communicates with second unit 104 and device 106 via any suitable wired, wireless, contact or contactless interface. In one embodiment, first unit 102 communicates with device 106 via a contactless interface, such as a radio frequency identification (RFID) interface. In one embodiment, first unit 102 includes a device reader and/or writer (not shown) capable of reading data from and/or writing data to device 106. In other embodiments, device 106 comprises one or more devices, and first unit 102 communicates with one, two or any suitable number of devices 106 at a time.

In the illustrated embodiment, first unit 102 can generate a key that is used to control access to device 106. In one embodiment, first unit 102 generates a key that is used to disable access to or lock device 106. First unit 102 programs the key into device 106, and thereafter access to device 106 is limited to users that have the key. In one embodiment, first unit 102 can generate a key that is used to enable access to or unlock a device 106 that has had a key programmed into device 106 that limits access to device 106 to users that have the key. In various embodiments, the term "key" comprises one or more keys and can refer to any suitable data that can be used to control access to one or more of the devices 106.

In the illustrated embodiment, the key controls the operation of a cryptographic algorithm. In some embodiments, the cryptographic algorithm is a symmetric key algorithm. In one embodiment, the symmetric key algorithm is the Triple Data Encryption Standard (TDES). In another embodiment, the symmetric key algorithm is the Advanced Encryption Standard (AES). In other embodiments, the cryptographic algorithm is an asymmetric algorithm.

In one embodiment, the key is generated using a suitable cryptographic algorithm such as TDES. In various embodiments, the key can be used for any suitable purpose. In one embodiment, the key is an encryption key that is used to encrypt data within device 106. In one embodiment, the key is an authentication key for confirming the integrity of data within device 106. In one embodiment, the key is an authorization key for providing different access privileges to device 106. In one embodiment, device 106 is a secure semiconductor-based device that provides only limited access, based on the key, to data stored within device 106. In various embodiments, secure semiconductor-based devices comprise integrated circuits, smart cards, electronic passports, or other suitable devices.

In the illustrated embodiment, system 100 utilizes first information, second information and third information to control generation and/or regeneration of the key. System 100 is configured to generate the key by using the cryptographic algorithm and the second and third information. In various embodiments, the cryptographic algorithm is TDES, AES or another suitable symmetric key algorithm. In other embodiments, the cryptographic algorithm is an asymmetric algorithm.

In the illustrated embodiment, the first information is any suitable data such as group or batch information. The second information is information that is identified or generated when at least part of device 106 is manufactured. Each second information corresponds to a unique device 106. In other embodiments, each second information corresponds to two or more devices 106. In the illustrated embodiment, the third information is a block of suitable data such as random data or a pseudo-random number. The second information and the third information have a format that is compatible with the cryptographic algorithm being used so that one or more cryptographic operations can be performed on the second information and the third information.

The second information and the third information can be processed using the cryptographic algorithm to generate or regenerate one or more of the keys. In one embodiment, the second information and the third information are combined before being processed by the cryptographic algorithm.

In the illustrated embodiment, second unit 104 associates one or more of the first information with a corresponding one or more of the third information. In one embodiment, the first information is provided from an external source to second unit 104. In another embodiment, the first information is generated by second unit 104. In one embodiment, second unit 104 generates the third information. By associating each one of the one or more first information with a corresponding one of the one or more third information, the first information can be used to identify the third information. Memory 114 in second unit 104 stores first data that associates each first information with corresponding third information.

In the illustrated embodiment, each device 106 includes unique second information which can be obtained from device 106 by utilizing a suitable reading device such as a device reader and/or writer, as previously described. In other embodiments, two or more of the devices 106 include the same second information. In one embodiment, the second information is a serial number that is unique to device 106. In other embodiments, the second information is any suitable data uniquely identifying device 106.

In the illustrated embodiment, first unit 102 does not have direct access to the third information but can request and receive third information from second unit 104. Second unit 104 is securely remote from first unit 102 and is configured to send the third information to first unit 102. To initiate the request, first unit 102 sends first information to second unit 104.

Upon receipt of the request from first unit 102 that includes first information, second unit 104 utilizes the first data that associates each third information with corresponding first information to identify the third information that corresponds to the first information sent from first unit 102. In one embodiment, second unit 104 obtains the third information by looking up the third information using the first information. In another embodiment, the third information is obtained at query time. For example, the first information is input into a process that, when executed by processor 112, produces the third information. Once the third information is obtained, second unit 104 sends the third information to first unit 102. In one embodiment, the third information is sent from second unit 104 to first unit 102 via a secure communications channel.

In the illustrated embodiment, first unit 102 reads second information from device 106. Processor 108 of first unit 102 uses this second information and the third information received from second unit 104 to generate the key. In one embodiment, the key is used to disable access to or lock device 106. First unit 102 programs the key into device 106, and thereafter access to device 106 is limited to users that have the key. In another embodiment, first unit 102 generates a key that is used to enable access to or unlock a device 106 that has had a key programmed into device 106 that limits access to device 106 to users that have the key.

In the illustrated embodiment, first unit 102 sends the second information obtained from device 106 and the first information to second unit 104. The second information is associated with the first information so that each one of the one or more first information corresponds to one of the one or more third information, and the first information can be used to identify the third information. Memory 114 in second unit 104 stores second data that associates each first information with corresponding second information. In one embodiment, processor 112 utilizes the first data and the second data to associate each first information with corresponding second information and third information. Each one of the one or more second information corresponds to one of the one or more third information, and each second information can be used to identify the corresponding third information.

Either before or after the one or more devices 106 have been programmed with a corresponding one or more keys, the one or more keys can be regenerated. For each second information that is provided to second unit 104 to request a corresponding key, the second data stored in memory 114 can be accessed to identify the first information that corresponds with the second information, and the first data stored in memory 114 can be accessed to identify the third information that corresponds with the first information. Once the second information and corresponding third information are obtained, processor 112 can use the one or more second information and the one or more third information generate a corresponding one or more keys. In one embodiment, the one or more second information and corresponding one or more keys are provided in a format or list that identifies each second information and the corresponding key. In this embodiment, the one or more keys can be used to enable access to or unlock the corresponding one or more devices 106.

In the illustrated embodiment, each corresponding key has been programmed into a corresponding device 106 by first unit 102 to disable access to or lock the device 106. A third party that receives one or more devices 106 and a list that identifies one or more second information and the corresponding one or more keys can obtain or read second information from each device 106 and identify the corresponding key via the list. The key can be used to enable access to or unlock the corresponding device 106.

In various embodiments illustrated herein, processor 108 of first unit 102 uses second information and third information to generate a key that is used to disable access to or lock device 106, and processor 112 of second unit 104 uses the second information and third information to regenerate the key to enable access to or unlock the device 106. By associating first information with second information and third information, the key can be generated and regenerated without having to store the key. In various embodiments, first unit 102 and second unit 104 can be at a same physical location or at different physical locations.

Figure 2:
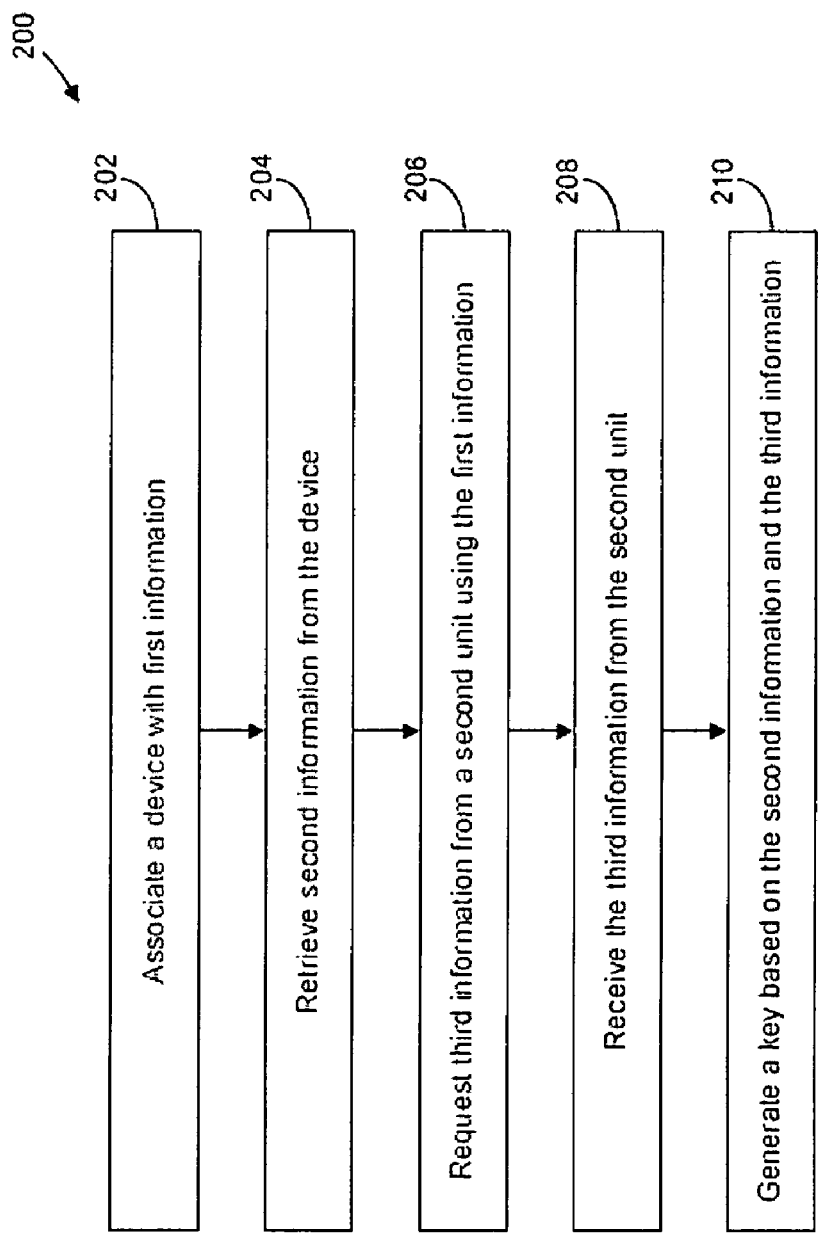
FIG. 2 is a flow diagram illustrating one embodiment of a method of generating a key.

FIG. 2 is a flow diagram illustrating one embodiment of a method 200 of generating a key. Device 106 is associated (at 202) with first information. In one embodiment, the first information is an integer index number that corresponds to third information. In one embodiment, the first information is provided by second unit 104. In one embodiment, second unit 104 receives first information and associates the first information with third information. In various embodiments, the first information is any suitable data that is capable of being associated with one or more devices 106.

First unit 102 retrieves (at 204) second information from device 106. In one embodiment, the second information is retrieved from device 106 using a device reader and/or writer, as previously described. In one embodiment, the second information is device-specific information, such as a unique identification (ID) number, generated during manufacturing of at least part of device 106. In other embodiments, the second information is any suitable indicia that distinguishes one device 106 from another device 106, and therefore can identify a particular device 106.

First unit 102 requests (at 206) third information from second unit 104. First unit 102 requests the third information by providing first information to second unit 104. In one embodiment, the third information is a random number, such as a 32-byte random or pseudo-random number. In another embodiment, the third information is a string of zeroes. In another embodiment, the third information is a string of ones. In another embodiment, the third information is any suitable data segment. In one embodiment, the third information is stored in memory 114 and is indexed to the first information.

First unit 102 securely receives (at 208) the third information from second unit 104. In the illustrated embodiment, second unit 104 provides third information that corresponds to the first information. In one embodiment, the third information is indexed to the first information, and the third information is obtained by looking up the third information using the first information. In another embodiment, the third information is obtained at query time. For example, the first information is input into a process that, when executed by processor 112, produces the third information. In other embodiments, the third information is obtained using other suitable approaches.

Processor 108 of first unit 102 generates (at 210) a key based on the second information and the third information. The key is generated by using a cryptographic algorithm with the second and third information. In various embodiments, the cryptographic algorithm is TDES, AES or another suitable symmetric key algorithm. In other embodiments, the cryptographic algorithm is an asymmetric algorithm. In the illustrated embodiment, the key may be programmed into a device 106 to disable access to or lock the device 106. Access to device 106 thereafter is limited to users that have the key.

Figure 3:
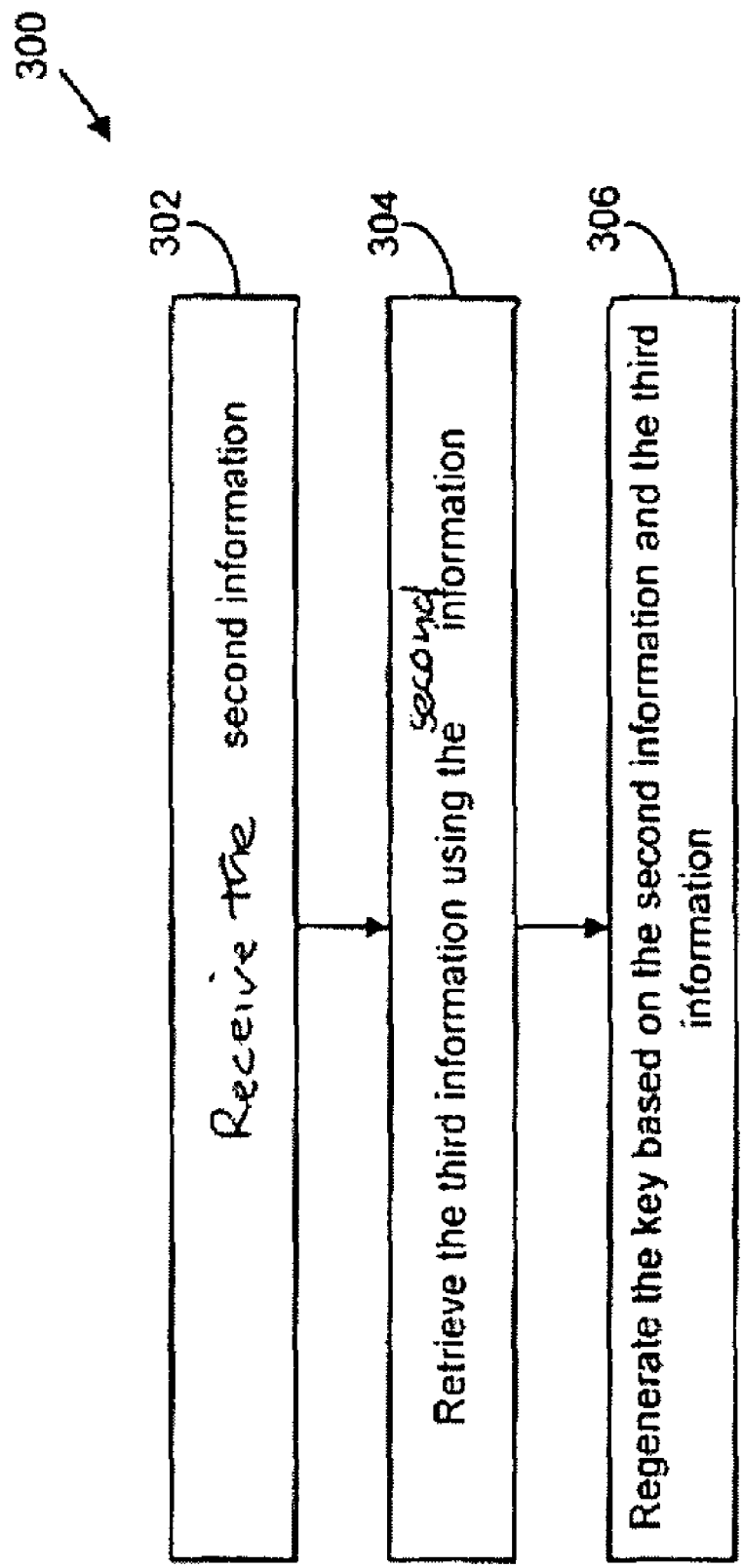
FIG. 3 is a flow diagram illustrating one embodiment of a method of generating a key.

FIG. 3 is a flow diagram illustrating one embodiment of a method 300 of generating a key. In this embodiment, a key is regenerated using the second information and the third information. In other embodiments, the key can be regenerated using any suitable combination of first information, second information or third information. In the illustrated embodiment, second unit 104 securely receives (at 302) the second information.

Second unit 104 retrieves (at 304) the third information using the second information. In one embodiment, for each second information that is provided to second unit 104 to request a corresponding key, the second data stored in memory 114 can be accessed to identify the first information that corresponds with the second information, and the first data stored in memory 114 can be accessed to identify the third information that corresponds with the first information. In another embodiment, the second data stored in memory 114 can be used to identify the corresponding third information.

Processor 112 of second unit 104 regenerates (at 306) the key based on the second information and the third information. The key is generated by using a cryptographic algorithm with the second and third information. In various embodiments, the cryptographic algorithm is TDES, AES or another suitable symmetric key algorithm. In other embodiments, the cryptographic algorithm is an asymmetric algorithm. In one embodiment, processor 112 generates one or more keys based on one or more second information and a corresponding one or more third information, and a corresponding one or more keys are provided in a format or list that identifies each second information and the corresponding key. In various embodiments, one or more keys can be used to enable access to or unlock a corresponding one or more devices 106.

Embodiments described and illustrated above provide systems and methods of controlling access to a device. It is to be understood that not all components and/or steps described and illustrated with reference to the Figures are required for all embodiments. In one embodiment, one or more of the illustrative methods are implemented as an application comprising program instructions that are tangibly embodied on one or more program storage devices or machine readable storage media (e.g., hard disk, magnetic floppy disk, universal serial bus (USB) flash drive, random access memory (RAM), read-only (ROM), CDROM, etc.), and executable by any device or machine comprising suitable architecture, such as a general purpose digital computer having a processor, memory, and input/output interfaces.

Although specific embodiments have been illustrated and described herein, it will be appreciated by those of ordinary skill in the art that a variety of alternate and/or equivalent implementations may be substituted for the specific embodiments shown and described without departing from the scope of the invention. This application is intended to cover any adaptations or variations of the embodiments discussed herein. Therefore, it is intended that this invention be limited only by the claims and the equivalents thereof.

What is claimed is:

1. A method of controlling access to a device, comprising:
   providing first information;
   retrieving second information by a first processor in a first unit from the device;
   sending the first information from the first unit to a second unit having a second processor;
   using the first information to retrieve associated third information by the second processor;
   sending the third information from the second unit to the first unit;
   generating a key by the first processor based on the second information and the third information; and
   controlling access to the device using the key.

2. The method of claim 1, wherein generating the key based on the second information and the third information comprises generating the key by performing a cryptographic operation on the second information and the third information.

3. The method of claim 2, wherein the cryptographic operation comprises using a symmetrical cryptographic algorithm.

4. The method of claim 2, wherein the cryptographic operation comprises using an asymmetrical cryptographic algorithm.

5. The method of claim 1, wherein controlling access to the device using the key comprises programming the key into the device to disable access to the device, and regenerating the key based on the second information and the third information to enable access to the device.

6. The method of claim 1, wherein using the first information to retrieve the associated third information comprises inputting the first information into a process that, when executed by a second processor, produces the third information.

7. The method of claim 1, wherein the second information comprises information that is unique to the device.

8. The method of claim 1, further comprising storing an association between the first information and the third information in a memory.

9. A method of controlling access to a device, comprising:
associating first information with third information;
retrieving second information that is associated with the device by a first unit having a first processor;
associating the second information with the first information;
limiting access to the device by:
    requesting the third information that is associated with the first information by the first processor by sending the first information to a second unit having a second processor;
    sending the third information from the second unit to the first unit;
    performing a cryptographic operation on the second information and the third information to generate a key by the first processor; and
    programming the key into the device to limit access to the device; and
providing the key to enable access to the device by:
    using the second information to identify the associated third information, via the associated first information by the second processor; and
    performing the cryptographic operation on the second information and the third information to regenerate the key by the second processor.

10. The method of claim 9, wherein the cryptographic operation comprises using a symmetrical cryptographic algorithm.

11. The method of claim 9, wherein the cryptographic operation comprises using an asymmetrical cryptographic algorithm.

12. The method of claim 9, wherein the second information is a serial number generated when at least part of the device is manufactured.

13. The method of claim 9, wherein the third information is a pseudo-random data segment.

14. The method of claim 9, wherein providing the key to enable access to the device comprises providing the key in a format that associates the second information and the key.

15. The method of claim 9, wherein each first information is associated with a unique third information, and wherein each first information is associated with and two or more of the second information.

16. A device access control system, comprising:
a first unit having a first processor configured to generate a key to control access to the device by retrieving second information from the device and using first information to obtain associated third information, wherein the key is generated by performing a cryptographic operation on the second information and the associated third information, and wherein the first unit associates the second information with the first information; and
a second unit having a second processor and a memory, the second processor configured to provide the associated third information to the first unit and store the second information and the associated first information in the memory, wherein the key is regenerated by using the second information to identify the associated third information via the associated first information and by performing the cryptographic operation on the second information and the associated third information.

17. The device access control system of claim 16, wherein the first unit comprises a device reader/writer configured to retrieve the second information from the device via a contactless interface.

18. The device access control system of claim 16, wherein the cryptographic operation comprises using a symmetrical cryptographic algorithm.

19. The device access control system of claim 16, wherein the cryptographic operation comprises using an asymmetrical cryptographic algorithm.

20. The device access control system of claim 16, wherein the second information is a serial number generated when at least part of the device is manufactured.

21. The device access control system of claim 16, wherein the third information is a pseudo-random data segment.

22. An access control system for controlling a plurality of devices, comprising:
a first unit having a first processor configured to be coupled to a device in the plurality of devices, to receive first information associated with at least one of the plurality of devices, and to retrieve, from the device, second information associated with only the device in the plurality of devices;
a second unit having a second processor configured to communicate with the first unit and to receive the first information and the second information from the first unit;
wherein the second unit is configured to provide third information based on the first information to the first unit so that the first unit can limit access to the device by generating a key by the first processor performing a cryptographic operation on the second information and the third information; and
wherein the second unit is configured to regenerate the key to enable access to the device by using the second information that is associated with only the device in the plurality of devices to retrieve the associated third information and by the second processor performing a cryptographic operation on the second information and the third information.

23. The access control system of claim 22, wherein the second unit is configured to generate one or more of the third information and associate each one of the third information with a unique one of the first information, and wherein the second unit is configured to use the second information from each one of the plurality of devices to retrieve the associated third information and perform a cryptographic operation on the second information from each one of the plurality of devices and the third information to regenerate a plurality of keys for the plurality of devices.

24. The access control system of claim 23, wherein the plurality of keys are provided in a format that associates the second information from each one of the plurality of devices with the key that was regenerated using the second information from each one of the plurality of devices and the third information.

25. The access control system of claim 22, wherein the first unit is configured to associate the second information with the first information and provide the second information and associated first information to the second unit.

26. A non-transitory machine-readable storage medium having instructions stored thereon for execution by a processor to perform a method of controlling access to a device, the method comprising:

providing first information;

retrieving second information from the device by a first processor in a first unit;

sending the first information from the first unit to a second unit having a second processor;

using the first information to retrieve associated third information by the second processor;

sending the third information from the second unit to the first unit;

generating a key by the first processor based on the second information and the third information; and controlling access to the device using the key.

* * * * *